US008266597B2

(12) United States Patent
Panchamukhi et al.

(10) Patent No.: US 8,266,597 B2
(45) Date of Patent: Sep. 11, 2012

(54) DYNAMICALLY PATCHING COMPUTER CODE USING BREAKPOINTS

(75) Inventors: Prasanna S. Panchamukhi, Bangalore (IN); Balbir Singh, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 1122 days.

(21) Appl. No.: 12/139,576

(22) Filed: Jun. 16, 2008

(65) Prior Publication Data

US 2009/0313611 A1 Dec. 17, 2009

(51) Int. Cl.
*G06F 9/44* (2006.01)
(52) U.S. Cl. ........ 717/129; 717/124; 717/126; 717/127; 717/130; 712/244; 712/233
(58) Field of Classification Search .................... 717/129
See application file for complete search history.

(56) References Cited

U.S. PATENT DOCUMENTS

| | | | | |
|---|---|---|---|---|
| 5,675,803 | A * | 10/1997 | Preisler et al. ................ | 717/131 |
| 5,764,989 | A * | 6/1998 | Gustafsson et al. .......... | 717/129 |
| 5,953,530 | A * | 9/1999 | Rishi et al. ................... | 717/127 |
| 6,026,235 | A | 2/2000 | Shaughnessy | |
| 6,295,644 | B1 | 9/2001 | Hsu et al. | |
| 6,643,842 | B2 * | 11/2003 | Angel et al. .................. | 717/130 |
| 6,708,326 | B1 * | 3/2004 | Bhattacarya .................. | 717/124 |
| 6,760,903 | B1 * | 7/2004 | Morshed et al. ............. | 717/130 |
| 6,874,139 | B2 | 3/2005 | Krueger et al. | |
| 6,915,513 | B2 | 7/2005 | Duesterwald et al. | |
| 6,928,536 | B2 | 8/2005 | Duesterwald et al. | |
| 6,968,546 | B2 * | 11/2005 | Lueh ............................ | 717/158 |
| 7,058,928 | B2 * | 6/2006 | Wygodny et al. ............ | 717/128 |
| 7,263,689 | B1 * | 8/2007 | Edwards et al. .............. | 717/127 |
| 7,293,259 | B1 * | 11/2007 | Dmitriev ...................... | 717/130 |
| 7,814,486 | B2 * | 10/2010 | Papakipos et al. ........... | 718/100 |
| 2002/0095661 | A1 * | 7/2002 | Angel et al. .................. | 717/130 |
| 2004/0049667 | A1 * | 3/2004 | McCormick et al. ........ | 712/233 |
| 2004/0068720 | A1 * | 4/2004 | Hundt .......................... | 717/158 |

(Continued)

FOREIGN PATENT DOCUMENTS

| | | |
|---|---|---|
| EP | 1316887 A2 | 6/2003 |
| JP | 2005063311 A2 | 3/2005 |

OTHER PUBLICATIONS

Title: Runtime software reorganization by traditional OS features, author: Nagamatsu, dated: 2000, source: IEEE.*

(Continued)

*Primary Examiner* — Chameli Das
(74) *Attorney, Agent, or Firm* — Matthew Talpis

(57) ABSTRACT

A first section of executable computer code of a computer program is dynamically patched by performing the following. A breakpoint is inserted at the first section of executable computer code. During execution of the computer program, an instruction counter is incremented on an instruction-by-instruction basis through the computer program. The instruction counter indicates a current instruction of the computer program being executed. The breakpoint where the instruction counter points to the first section of executable computer code is encountered, which results in a breakpoint handler being called. The breakpoint handler changes the instruction pointer to instead point to a second section of executable computer code. The second section of executable computer code is a patched version of the first section of executable computer code. Upon the breakpoint handler returning, the second section of executable computer code is executed in lieu of the first section of executable computer code.

19 Claims, 3 Drawing Sheets

U.S. PATENT DOCUMENTS

| | | | |
|---|---|---|---|
| 2004/0107416 A1* | 6/2004 | Buban et al. | 717/170 |
| 2004/0163077 A1* | 8/2004 | Dimpsey et al. | 717/130 |
| 2006/0037003 A1* | 2/2006 | Long et al. | 717/127 |
| 2006/0095895 A1 | 5/2006 | Sudheer | |
| 2006/0101181 A1* | 5/2006 | Post et al. | 710/266 |
| 2006/0277539 A1* | 12/2006 | Amarasinghe et al. | 717/168 |
| 2006/0277540 A1* | 12/2006 | Bhattacharya | 717/174 |
| 2006/0294430 A1 | 12/2006 | Bunker et al. | |
| 2007/0006168 A1* | 1/2007 | Dimpsey et al. | 717/130 |
| 2009/0259999 A1* | 10/2009 | Srinivasan | 717/170 |
| 2009/0318935 A1* | 12/2009 | Sundar et al. | 606/130 |

OTHER PUBLICATIONS

Title: Dynamic Patching of Embedded Software, author: Bombardier Transp, dated: Apr. 3, 2007, source: IEEE.*

J.R. Moser, "Hot patching," http://lkml.org/lkml/2005/9/20/270, Sep. 20, 2005.

"Patch (computing)," http://en.wikipedia.org/wiki/Software_hot_patch#Hot_patching, last modified Apr. 14, 2008.

"Hot-patch technology supports device QA teams," http://www.linuxdevices.com/news/NS7793899264.html, Feb. 13, 2007.

Steve Dispensa, "Kernel mustard," http://msmvps.com/blogs/kernelmustard/archive/2005/04/25/44413.aspx, Apr. 25, 2005.

M. Hicks et al., "Dynamic software updating," Trans. Program. Lang. Syst. 27 (6): 1049-1096 (year 2005).

R. Hundt, "HP Caliper—An Architecture for Performance Analysis Tools," First Workshop on Industrial Experience with Systems Software, WIESS-2001 (year 2001).

* cited by examiner

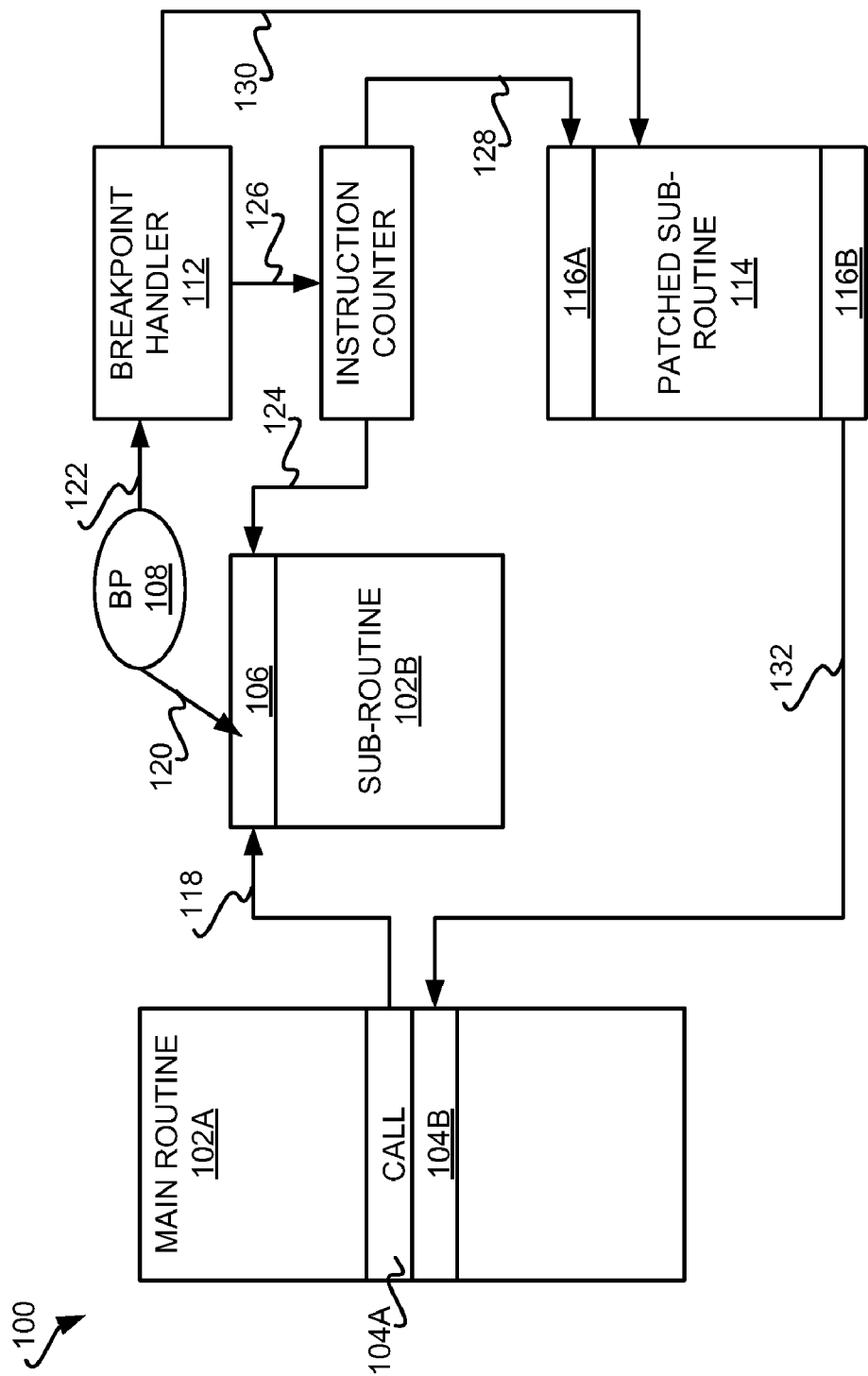

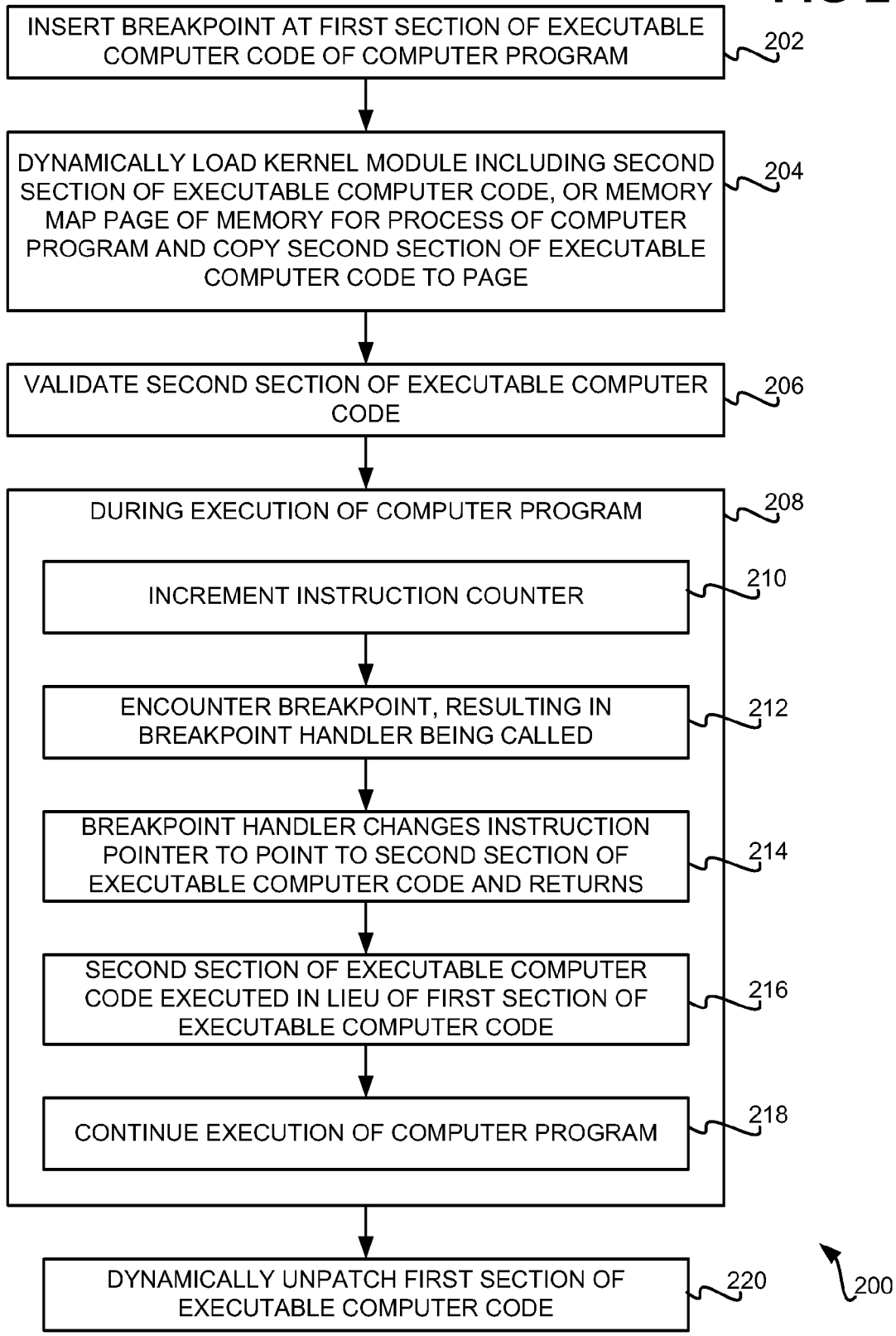

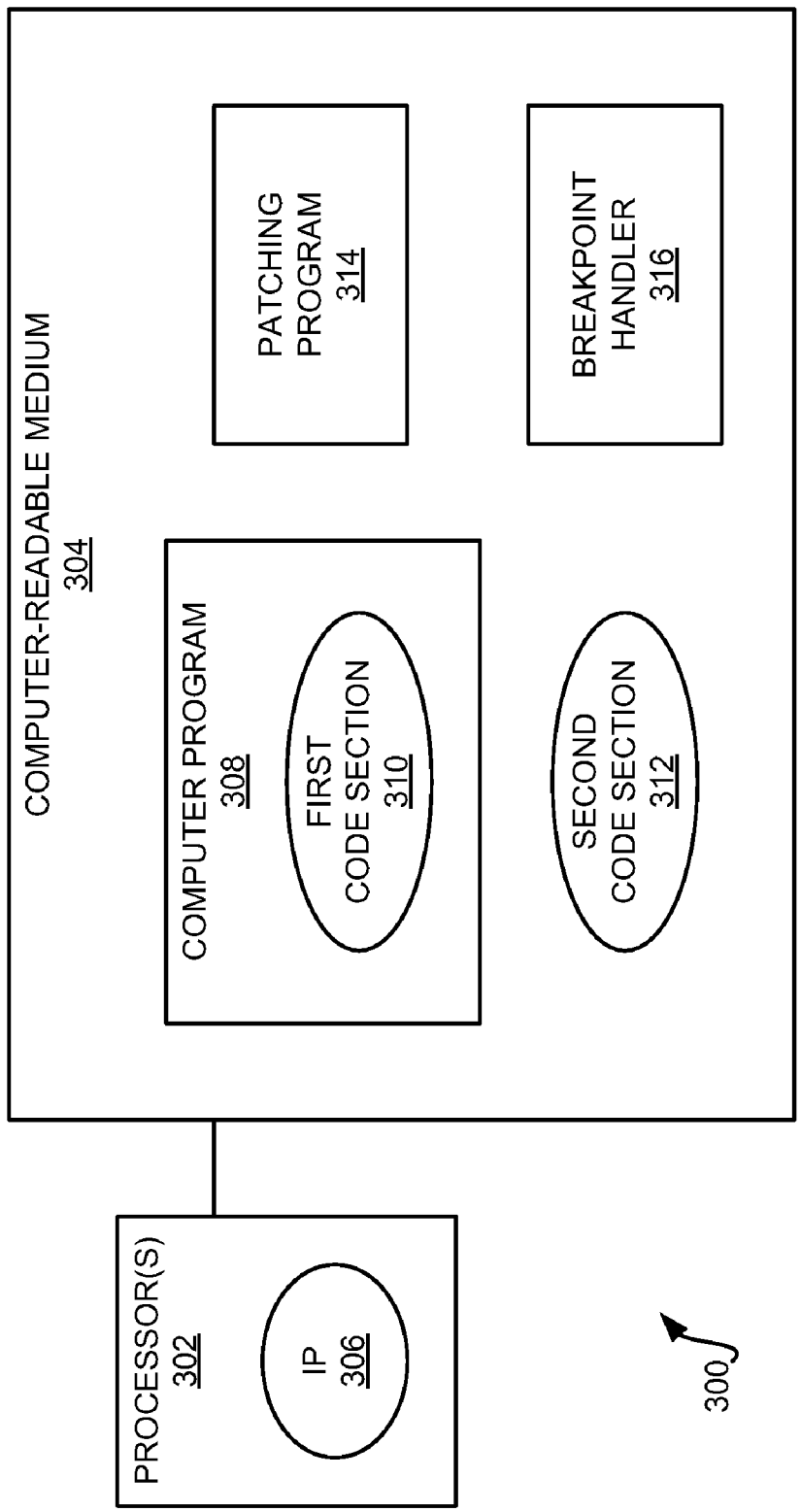

DYNAMICALLY PATCHING COMPUTER CODE USING BREAKPOINTS

FIELD OF THE INVENTION

The present invention relates generally to patching computer code, and more specifically to dynamically patching computer code using breakpoints.

BACKGROUND OF THE INVENTION

Computer programs having sections of executable computer code frequently require patching. For example, it may be learned that operating systems and application programs, as well as other types of computer programs, have vulnerabilities to malware like viruses. Therefore, the computer programs have to be updated, or patched, in order to remove such vulnerabilities.

Existing approaches to patching computer code are disadvantageous, however. A technique known as symbol patching requires that all processors currently executing the computer code be halted, among other disadvantages, so that the computer code can be updated or patched. Halting the processors currently executing the computer code is disadvantageous, however, because it means that any systems employing the computer code may have reduced performance while the processors are halted for the patching process to be performed. As such, the patching process is a static, as opposed to a dynamic, process. For systems that have to be highly available, having reduced performance, event momentarily, is undesirable. Even for systems that do not have to be highly available, having reduced performance can be undesirable.

Another technique known as marking, or efficient marking, likewise can require that all processors currently executing the computer code to be halted, among other disadvantages, so that the computer code can be updated or patched. In the marking approach, specific points within the kernel, primarily function entry points, are marked with an extended set of no-operation (NOP) instructions. If a function requires patching, the system is patched by replacing these NOP instructions with a jump instruction to the patched code. In the efficient marking approach, an additional optimization is employed. Additional code is generated to add two NOP instructions, the first of which being a small two-byte NOP instruction. When the system is hot-patched, the two-byte NOP instruction is replaced with a jump to the second NOP instruction, which eventually jumps to the final patched function or routine.

Disadvantages associated with marking and efficient marking, in addition to having to halt the processors currently executing the computer code in question, including the following. First, the locations of the markers have to be known a priori and set at compile time, such that functions can only be patched if they have had such markers set at this time; otherwise, the functions cannot be patched at a later point in time. Second, the size of the code section becomes bloated, since additional space overhead is required. The present invention as described below overcomes all these disadvantages.

SUMMARY OF THE INVENTION

The present invention relates to dynamically patching computer code using breakpoints. A method of one embodiment of the invention is for dynamically patching a first section of executable computer code of a computer program. The method inserts a breakpoint at the first section of executable computer code. During execution of the computer program, an instruction counter is incremented on an instruction-by-instruction basis through the computer program. The instruction counter indicates a current instruction of the computer program being executed.

The breakpoint is encountered where the instruction pointers points to the first section of executable computer code. This results in a breakpoint handler being called. The breakpoint handler changes the instruction pointer to instead point to a second section of executable computer code. The second section of executable computer code is a patched version of the first section of executable computer code. Thus, upon the breakpoint handler returning, the second section of executable computer code is executed in lieu of the first section of executable computer code.

A system of an embodiment of the invention includes one or more processors and a computer-readable medium. The processors have an instruction pointer indicating a current instruction of a computer program being executed. The computer-readable medium is to store the computer program executed by the processors. The computer program has a first section of executable computer code to be dynamically patched. The computer-readable medium stores a second section of executable computer code that is a patched version of the first section of executable computer code.

The computer-readable medium also stores a patching program and a breakpoint handler. The patching program is to insert a breakpoint at the first section of executable computer code of the computer program. The breakpoint handler is called upon the breakpoint being encountered, to change the instruction pointer to point to the second section of executable computer code instead of to the first section of computer code. The second section of executable computer code is thus executed in lieu of the first section of executable computer code.

An article of manufacture of an embodiment of the invention includes a computer-readable medium. The computer-readable medium may be a tangible computer-readable medium, such as a recordable data storage medium. The medium stores a patching program that is to insert a breakpoint at a first section of executable computer code of a computer program that is executed by one or more processors having an instruction pointer. The medium stores a second section of executable computer code that is a patched version of the first section of executable computer code.

As in the system embodiment, the computer-readable medium in the article of manufacture embodiment also stores a patching program and a breakpoint handler. The patching program is to insert a breakpoint at the first section of executable computer code of the computer program. The breakpoint handler is called upon the breakpoint being encountered, to change the instruction pointer to point to the second section of executable computer code instead of to the first section of computer code. The second section of executable computer code is thus executed in lieu of the first section of executable computer code.

Embodiments of the invention provide for advantages over the prior art. Unlike in the prior art, computer code is able to be patched dynamically. Any processor currently executing the computer code do not have to be halted for the patching process to occur. Rather, the computer code can be patched dynamically, while the computer code is currently being executed. This is achieved by inventive use of breakpoints.

Furthermore, embodiments of the invention do not require markers to be added, unlike the marking and efficient marking approaches of the prior art. This means that the functions that may be patched do not have to be known a priori within embodiments of the invention, which is required by marking because markers have to be added during compile time. That is, the locations at which breakpoints are added in embodiments of the invention do not have to be known a priori at compile time. This also means that embodiments of the invention do not have the code bloat that results from adding such markers within the prior art, because markers (i.e., no-operation instructions) do not have to be added within embodiments of the invention.

Still other aspects, advantages, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a diagram exemplarily depicting computer code being dynamically patched by using a breakpoint, according to an embodiment of the invention.

FIG. 2 is a flowchart of a method for dynamically patching computer code using a breakpoint, according to an embodiment of the invention.

FIG. 3 is a diagram of a system, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

FIG. 1 shows an example 100 in which computer code is dynamically patched by using a breakpoint, according to an embodiment of the invention. The example 100 includes a computer program 102 made up of a main routine 102A and a sub-routine 102B. The sub-routine 102B may be a function, for instance, that is called by a function call instruction 104A of the main routine 102A of the computer program 102. The sub-routine 102B is the section of executable computer code that is being dynamically patched within the example 100.

A breakpoint 108 is inserted or added at a first line, or instruction, 106 of the sub-routine 102B, as indicated by the arrow 120. A breakpoint is an intentional stopping or pausing place in a computer program, which is typically put in place for debugging purposes. However, in embodiments of the invention, the breakpoint 108 is novelly employed for dynamically patching the sub-routine 102B, instead of for debugging purposes.

During execution of the computer program 102, an instruction counter 110 is incremented on an instruction-by-instruction basis through the computer program 102. The instruction counter 110 indicates the current instruction of the computer program 102 being executed by a processor. The instruction counter 110 may also be referred to as a program counter, and is a register within a processor that indicates where the processor is in its instruction sequence. The instruction counter 100 is automatically incremented for each instruction cycle.

The sub-routine 102 is dynamically patched by a patched sub-routine 114. That is, the patched sub-routine 114 is executed in lieu of the sub-routine 102 being executed. The patched sub-routine 114 is thus a patched version of the sub-routine 102. The dynamic patching process is now described.

During execution of the computer program 102, the call instruction 104A of the main routine 102A of the computer program 102 is encountered. This results in execution being transferred to the first line, or instruction, 106 of the sub-routine 102B, as indicated by the arrow 118. At this time, then, the instruction counter 110 points to the first line, or instruction, 106 of the sub-routine 102B, as indicated by the arrow 124. However, as has been noted, the breakpoint 108 is associated with the first line, or instruction, 106 of the sub-routine 102B, as indicated by the arrow 120.

Therefore, upon the breakpoint 108 being encountered, execution of the computer program 102 stops, and the first line, or instruction, 106 of the sub-routine 102B is not actually executed. Rather, a breakpoint handler 112 is called, as indicated by the arrow 122. The breakpoint handler 112 changes the instruction counter 110, as indicated by the arrow 126, to point to a first line, or instruction, 116A of the patched sub-routine 114, as indicated by the line 128, instead of to the first line, or instruction, 106 of the sub-routine 102B. At that point, the breakpoint handler 112 returns execution to the computer program 102.

However, because the instruction counter 110 now points to the patched sub-routine 114 instead of to the sub-routine 102B, the patched sub-routine 114 is executed instead of the sub-routine 102B. This is indicated by the arrow 130 indicating that the breakpoint handler 112 returns execution to the patched sub-routine 114 instead of to the sub-routine 102B, again by virtue of the instruction counter 110 having been changed by the breakpoint handler 112. The patched sub-routine 114 is thus executed on an instruction-by-instruction basis.

Once the patched sub-routine 114 has been completely executed, at a last line 116B thereof for instance, execution returns to the main routine 102A, at an instruction line 104B immediately after the call instruction 104A within the main routine 102A. In this way, then, the patched sub-routine 114 dynamically patches or updates the sub-routine 102B. The ability of the processor executing the computer program 102 to employ breakpoints to interrupt execution of the computer program 102, intended for debugging purposes, is instead novelly leveraged for patching purposes.

It is noted that the stack, not shown in FIG. 1, that would otherwise have been used for execution of the sub-routine 102B is used for execution of the patched sub-routine 114. However, any static data stored within the sub-routine 102B is lost. Furthermore, arguments to the sub-routine 102B cannot be modified, due to the same stack being used for the patched sub-routine 114.

It is further noted that the dynamic patching technique that has been described does not require any recompilation of the sub-routine 102B or the main routine 102A themselves to add any special code for dynamic patching, to add markers, and so on. Rather, the dynamic patching process instead uses the breakpoint functionality afforded by modern computing processors. The breakpoint handler 112 that would normally be used to collect data for debugging is instead used to modify the instruction counter 110 of the processor in question to point to the patched sub-routine 114 instead of to the sub-routine 102B of the computer program 102.

FIG. 2 shows a method 200 that more generally describes the dynamic patching process, according to an embodiment of the invention. The method 200 is implemented in relation to a first section of executable computer code of a computer program, where the first section of executable computer code is to be patched. In particular, a second section of executable computer code, that is a patched version of the first section of executable computer code, is executed in lieu of the first section of executable computer code of the computer program.

It is noted that the first section of executable computer code can be a complete function, such as the sub-routine 102B of FIG. 1 that has been described, or it may be a section of computer code other than a complete function of the computer program. For instance, the first section of executable computer code may just be one or more lines of a routine, such as a function, of the computer program. Embodiments of the invention, in other words, are applicable to any collection of one or more lines of executable computer code of a computer program.

The method 200 inserts a breakpoint at the first section of executable computer code of the computer program (202). Thereafter, the second section of executable computer code is loaded as follows (204). If the computer program encompassing the first section of executable computer code is the part of the kernel of an operating system, for instance, a new kernel module including the second section of executable computer code is loaded. Alternatively, if the computer program encompassing the first section of executable computer code is part of a program other than the kernel of an operating system—such as an application computer program, for instance—a page of memory is mapped for the process of the computer program, and the second section of executable computer code is copied to the page in question.

If the first section of executable computer code of the computer program is a complete function, then the second section of executable computer code is validated (206). In particular, it is determined that the second section of executable computer code is also a function, and that the function of the second section has identical function arguments and identical function argument types as the function of the first section does. This validation can be performed to ensure that the second section of executable computer code will be able to properly replace the first section of executable computer code and be properly executed in its place.

During execution of the computer program (208), an instruction counter is incremented on an instruction-by-instruction basis through the computer program, and following the control flow of the computer program. As has been noted, the instruction counter is a register of a processor that indicates the current instruction of the computer program that is being executed. At some point, the breakpoint that was previously inserted is encountered (212), particularly when the instruction pointers points to the first section of executable computer code. This results in a breakpoint handler being called. That is, execution of the computer program is effectively interrupted, with execution instead proceeding to the breakpoint handler to handle the breakpoint that has been encountered.

The breakpoint handler changes or modifies the instruction pointer to point to the second section of the executable computer code instead of to the first section of the executable computer code (214), and returns execution back to the computer program. The computer program resumes execution at the instruction pointed to by the instruction pointer. Because the instruction pointer now points to the second section of the executable computer code, this second section is executed in lieu of the first section of executable computer code being executed (216).

Once the second section has been completely executed, the computer program continues execution as before (218). Thus, the first section of executable computer code may never be executed at all. For instance, where the first executable computer code is a function, when the second executable computer code returns control to the portion of the computer program that called the first section of executable computer code, the program continues execution immediately after where the first section was called. That is, control is not returned to the first section from the second section, and the second section completely replaces the first section in this way.

It is noted that the approach that has been described permits nested patching. For instance, in the example that has been described, the second section of computer code is executed instead of the first section of computer code, such that the second code section has patched the first code section. The second code section itself can be patched using a third code section in the same manner that the first code section has been patched. Thus, there is a resultant nesting of patches—the first code section being patched by the second code section, and the second code section being patched by the third section of executable computer code. The third code section is nested within the second code section, which is nested within the first code section. Such nested code patching can be achieved to any number of levels as desired.

It is further noted that at some point it may be desired to unpatch the first section of executable computer code (220), such that the first section is executed going forward instead of the second section of executable computer code. This may be desired, for instance, where a bug has been detected within the second section. Such dynamic unpatching is achieved by simply removing the breakpoint that has been inserted. At that time, the second section of executable computer code can be removed from memory.

FIG. 3 shows a computerized system 300, according to an embodiment of the invention. The system 300 includes one or more processors 302 and a computer-readable medium 304. Those of ordinary skill within the art can appreciate that the system 300 can and typically will include other components, in addition to the processors 302 and the computer-readable medium 304 as depicted in FIG. 3.

The processors 302 include an instruction pointer 306, as has been described. The computer-readable medium 304 may be a semiconductor, optical, and/or magnetic medium, as can be appreciated by those of ordinary skill within the art. The computer-readable medium 304 stores a computer program 308 having a first code section 310, as well as a second code section 312, a patching program 314, and a breakpoint handler 316.

The first code section 310 is the section of code to be dynamically patched. The second code section 312 is the second of code that represents an updated version of the first code section 310, and that is to be executed in lieu of the first code section 310 to be executed. The patching program 314 inserts a breakpoint at the first code section 310.

When the processors 302 executing the computer program 308 encounter the breakpoint, the breakpoint handler 316 is called. The breakpoint handler changes the instruction pointer 306 to point to the second code section 312 instead of to the first code section 310. In this way, the second code section 312 is executed in lieu of the first code section 310 being executed. Such dynamic patching of the first code section 310 is performed without any of the processors 302 having to be halted.

As has been described above, nested patching can also be achieved. Thus, a third section of executable computer code may be stored on the computer-readable medium 304, which is not depicted in FIG. 3. This third code section may be an updated and patched version of the second code section 312, which itself is a patched and updated version of the first code section 310. Additional levels of such nested patching, where a fourth code section may be an updated and patched version of the third code section, a fifth code section may be an updated and patched version of the fourth code section, and so on, is also possible.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:

1. A method for dynamically patching a first section of executable computer code of a computer program, comprising:
    inserting a breakpoint at the first section of executable computer code of the computer program;
    during execution of the computer program by a processor of a computing device,
        an instruction counter incrementing on an instruction-by-instruction basis through the computer program, the instruction counter indicating a current instruction of the computer program being executed, the instruction counter incremented by the processor;
        encountering the breakpoint where the instruction pointer points to the first section of executable computer code, resulting in a breakpoint handler being called, the breakpoint encountered by the processor;
        the breakpoint handler changing the instruction pointer to instead point to a second section of executable computer code, the second section of executable computer code being a patched version of the first section of executable computer code, the breakpoint handler executed by the processor; and,
        upon the breakpoint handler returning, the second section of executable computer code being executed by the processor in lieu of the first section of executable computer code,
    wherein the first section of executable computer code of the computer program is dynamically patched without having to know at time of compiling a location at which the breakpoint is to be added at the first section of executable computer code.

2. The method of claim 1, wherein the first section of executable computer code of the computer program is dynamically patched without having to halt any processor being used to execute the computer program.

3. The method of claim 1, wherein the first section of executable computer code of the computer program is dynamically patched without having to add markers, the markers comprising no-operation (NOP) instructions.

4. The method of claim 1, wherein the computer program is a kernel of an operating system.

5. The method of claim 4, further comprising dynamically loading a kernel module including the second section of executable computer code.

6. The method of claim 1, wherein the computer program is a computer program other than a kernel of an operating system.

7. The method of claim 6, further comprising:
    memory mapping a page of memory for a process of the computer program; and,
    copying the second section of executable computer code to the page.

8. The method of claim 1, wherein the first section of executable computer code is a function of the computer program.

9. The method of claim 8, further comprising validating the second section of executable computer code by determining whether the second section of executable computer code is a function having identical function arguments and function argument types as the function of the first section of executable computer code.

10. The method of claim 8, further comprising upon the second section of executable computer code having been executed, continuing execution of the computer program immediately after where the first section of executable computer code was called.

11. The method of claim 1, wherein the first section of executable computer code is a section of computer code other than a complete function of the computer program.

12. The method of claim 1, further comprising dynamically unpatching the first section of executable computer code by at least removing the breakpoint.

13. A system comprising:
    one or more processors having an instruction pointer indicating a current instruction of a computer program being executed;
    a non-transitory computer-readable medium to store:
        the computer program executed by the processors, the computer program having a first section of executable computer code to be dynamically patched;
        a second section of executable computer code that is a patched version of the first section of executable computer code;
        a patching program to insert a breakpoint at the first section of executable computer code of the computer program;
        a breakpoint handler that is called upon the breakpoint being encountered, the breakpoint handler to change the instruction pointer to point to the second section of executable computer code instead of to the first section of computer code,
    wherein the second section of executable computer code is executed in lieu of the first section of executable computer code,
    and wherein the first section of executable computer code of the computer program is dynamically patched without having to know at time of compiling a location at which the breakpoint is to be added at the first section of executable computer code.

14. The system of claim 13, wherein the computer-readable medium is to further store a third section of executable computer code that is a patched version of the second section of executable computer code.

15. The system of claim 13, wherein the first section of executable computer code of the computer program is dynamically patched by the second section of executable computer code without any of the processors having to be halted.

16. The system of claim 13, wherein the computer program is a kernel of an operating system.

17. The system of claim 13, wherein the computer program is a computer program other than a kernel of an operating system.

18. The system of claim 13, wherein the first section of executable computer code of the computer program is dynamically unpatched by removing the breakpoint.

19. An article of manufacture comprising:

a non-transitory computer-readable medium;

a patching program stored within the computer-readable medium and that is to insert a breakpoint at a first section of executable computer code of a computer program that is executed by one or more processors having an instruction pointer;

a second section of executable computer code stored within the computer-readable medium and that is a patched version of the first section of executable computer code;

a breakpoint handler that is called upon the breakpoint being encountered, the breakpoint handler to change the instruction pointer to point to the second section of executable computer code instead of to the first section of computer code, wherein the second section of executable computer code is executed in lieu of the first section of executable computer code, and wherein the first section of executable computer code of the computer program is dynamically patched without having to know at time of compiling a location at which the breakpoint is to be added at the first section of executable computer code.

* * * * *